(12) United States Patent
Yamamoto (10) Patent No.: US 7,099,562 B1
(45) Date of Patent: Aug. 29, 2006

(54) IMAGE DATA RECORDING APPARATUS (75) Inventor: Toshinori Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1141 days.

(21) Appl. No.: 09/620,475

(22) Filed: Jul. 20, 2000

(30) Foreign Application Priority Data

Jul. 27, 1999 (JP) .................................. 11-212547

(51) Int. Cl.
*H04N 5/91* (2006.01)

(52) U.S. Cl. ........................................ 386/95; 386/125

(58) Field of Classification Search .................. 386/46, 386/95, 111, 112, 125, 126, 70; 369/53.7
See application file for complete search history.

(56) References Cited

U.S. PATENT DOCUMENTS

| | | | | |
|---|---|---|---|---|
| 5,598,391 A | * | 1/1997 | Mukawa | 369/53.37 |
| 5,745,645 A | * | 4/1998 | Nakamura et al. | 386/131 |
| 5,949,953 A | * | 9/1999 | Shirakawa et al. | 386/70 |
| 6,009,237 A | * | 12/1999 | Hirabayashi et al. | 386/111 |
| 6,047,103 A | * | 4/2000 | Yamauchi et al. | 386/94 |

* cited by examiner

*Primary Examiner*—Huy Nguyen
(74) *Attorney, Agent, or Firm*—Fitzpatrick, Cella, Harper & Scinto (57) ABSTRACT

According to the invention, there is provided a recording apparatus constructed in such a manner that when image data and management data representing a recording start address and a recording end address on a recording medium of the image data are recorded on the recording medium, the recording operation is controlled so as to record a predetermined value in place of the recording end address.

23 Claims, 8 Drawing Sheets

| |
|---|
| ADDRESS OF TOC AREA OF CUT 1 |
| ADDRESS OF TOC AREA OF CUT 2 |
| ADDRESS OF TOC AREA OF CUT 3 |
| ADDRESS OF TOC AREA OF CUT 4 |
| |
| |
| |
| CUT 1/SECTOR 1/START ADDRESS |
| CUT 1/SECTOR 1/END ADDRESS |
| CUT 1/RECORDING MODE |
| CUT 2/SECTOR 1/START ADDRESS |
| CUT 2/SECTOR 1/END ADDRESS |
| CUT 2/RECORDING MODE |
| CUT 3/SECTOR 1/START ADDRESS |
| CUT 3/SECTOR 1/END ADDRESS |
| CUT 3/RECORDING MODE |
| CUT 4/SECTOR 1/START ADDRESS |
| CUT 4/SECTOR 1/END ADDRESS |
| CUT 4/SECTOR 2/START ADDRESS |
| CUT 4/SECTOR 2/END ADDRESS |
| CUT 4/RECORDING MODE |
| |
| |
| |

RECORDING MODE:
WR PROTECTION, COPY GENERATION,
CAMERA MODE, PHOTOGRAPHING DATE,
TITLE, FOR EXAMPLE

FIG. 5A
DATA EXAMPLE OF DATA AREA

| H1 | GOP1 | HT | TOC |

FIG. 5B
DATA EXAMPLE OF DATA AREA

| H1 | GOP1 | H2 | GOP2 | HT | TOC |

FIG. 5C
DATA EXAMPLE OF DATA AREA

| H1 | GOP1 | H2 | GOP2 | H3 | GOP3 | HT | TOC |

| |
|---|
| ADDRESS OF TOC AREA OF CUT 1 |
| ADDRESS OF TOC AREA OF CUT 2 |
| ADDRESS OF TOC AREA OF CUT 3 |
| ADDRESS OF TOC AREA OF CUT 4 |
| |
| |
| CUT 1/SECTOR 1/START ADDRESS |
| CUT 1/SECTOR 1/END ADDRESS |
| CUT 1/SECTOR 2/START ADDRESS |
| CUT 1/SECTOR 2/END ADDRESS |
| CUT 1/RECORDING MODE |
| CUT 2/SECTOR 1/START ADDRESS |
| CUT 2/SECTOR 1/END ADDRESS |
| CUT 2/RECORDING MODE |
| CUT 3/SECTOR 1/START ADDRESS |
| CUT 3/SECTOR 1/END ADDRESS |
| CUT 3/SECTOR 2/START ADDRESS |
| CUT 3/SECTOR 2/END ADDRESS |
| CUT 3/SECTOR 3/START ADDRESS |
| CUT 3/SECTOR 3/END ADDRESS |
| CUT 3/RECORDING MODE |
| CUT 4/SECTOR 1/START ADDRESS |
| CUT 4/ABNORMAL END FLAG |
| CUT 4/RECORDING MODE |
| |
| |
| |

RECORDING MODE:
WR PROTECTION, COPY GENERATION, CAMERA MODE, PHOTOGRAPHING DATE, TITLE, FOR EXAMPLE

THIS DATA REMAINS IN CASE OF THAT ELECTRIC POWER IS SHUT DOWN ABNORMALLY DURING RECORDING.

IMAGE DATA RECORDING APPARATUS

BACKGROUND OF THE INVENTION

1. Field of the Invention

The invention relates to an image signal recording apparatus and, more particularly, to an apparatus for recording an image signal to a disk-shaped recording medium.

2. Related Background Art

Hitherto, in an apparatus for recording and reproducing image data and audio data to/from a disk medium such as MD, DVD, or the like, management data called TOC (Table of Contents) to manage the recorded image/audio data is recorded to the disk. In this case, the TOC data is recorded into a TOC area different from a data area on the disk where the image/audio data is recorded.

Therefore, when the contents of the TOC data are changed in dependence on the recorded data, a head or a pickup is moved to the TOC area each time and the TOC data is rewritten.

To reduce the number of times of the seeking operation of the head or pickup to the TOC area during the recording of data into the data area, there has been proposed an apparatus such that the TOC data is stored in a built-in memory during the data recording and the TOC data is written back to the TOC area on the disk from the memory at the end of recording.

According to the system such that the TOC data is stored in the memory and it is written onto the disk at the end of recording, however, if the apparatus is suddenly made inoperative or the like during the data recording due to a trouble with a power supply of the apparatus or the like, the TOC data corresponding to the data which is being recorded is not recorded on the disk. There is, consequently, such a problem that it is impossible to access to the data which has been being recorded at the time of occurrence of the trouble.

SUMMARY OF THE INVENTION

It is an object of the invention to solve the problems as mentioned above.

Another object of the invention is to prevent such a situation that management data is not recorded, thereby enabling recorded data to be preferably reproduced.

According to one preferred aspect of the invention, the above object is accomplished by a recording apparatus for recording image data on a recording medium, comprising: recording means for recording image data and management data representing a recording start address and a recording end address on the recording medium of the image data onto the recording medium; and control means for controlling the recording means so as to record a predetermined value in place of the recording end address.

The above and other objects and features of the present invention will become apparent from the following detailed description and the appended claims with reference to the accompanying drawings.

DETAILED DESCRIPTION OF THE PREFERRED EMBODIMENT

An embodiment of the invention will now be described hereinbelow with reference to the drawings.

In the embodiment, an MPEG (Moving Picture coding Experts Group) system is used as an encoding system. In the MPEG system, generally, input image data is divided into three kinds of frames as shown in FIG. 2, and the frames are encoded and transmitted respectively.

Figure 2:
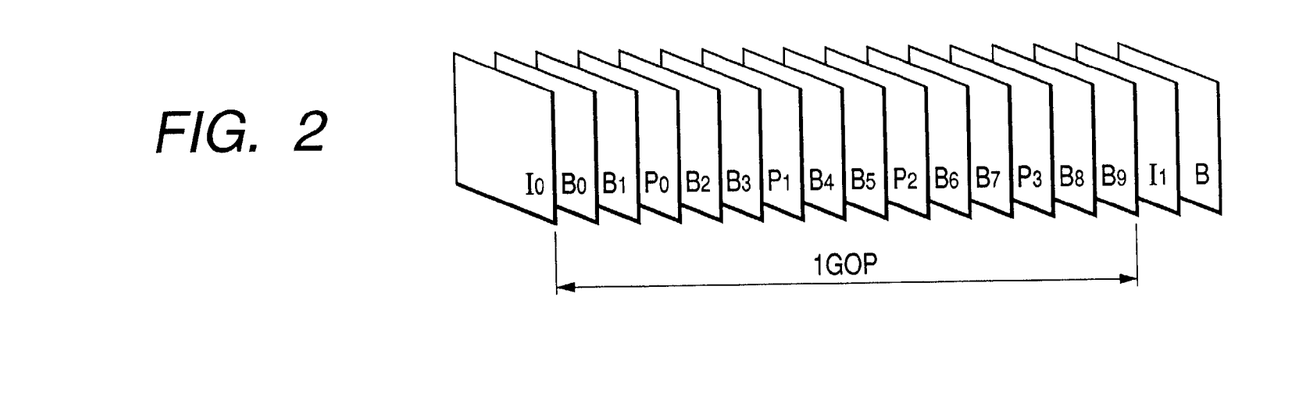
FIG. 2 is a diagram showing a state of an image data train which is encoded by the apparatus of FIG. 1.

In FIG. 2, reference character I denotes an I picture (Intra Picture). The I picture is a data train of a frame which was intra-frame encoded. Reference character P denotes a P picture (Predictive Picture). The P picture is a data train of a frame which is predicted from the past I picture or P picture. Reference character B denotes a B picture (Bidirectional Picture). The B picture is a data train of a frame which is predicted from the past and future I pictures or P pictures.

As shown in FIG. 2, according to the above frame data trains which are classified into three kinds, fifteen frames in a range from the I picture to the picture before the next I picture are called GOP (Group Of Pictures) and are set to be an encoding unit in the MPEG system. It is not always necessary to set 1 GOP to 15 frames but it can be set to arbitrary n frames (n is an integer of 2 or more).

Figure 9:
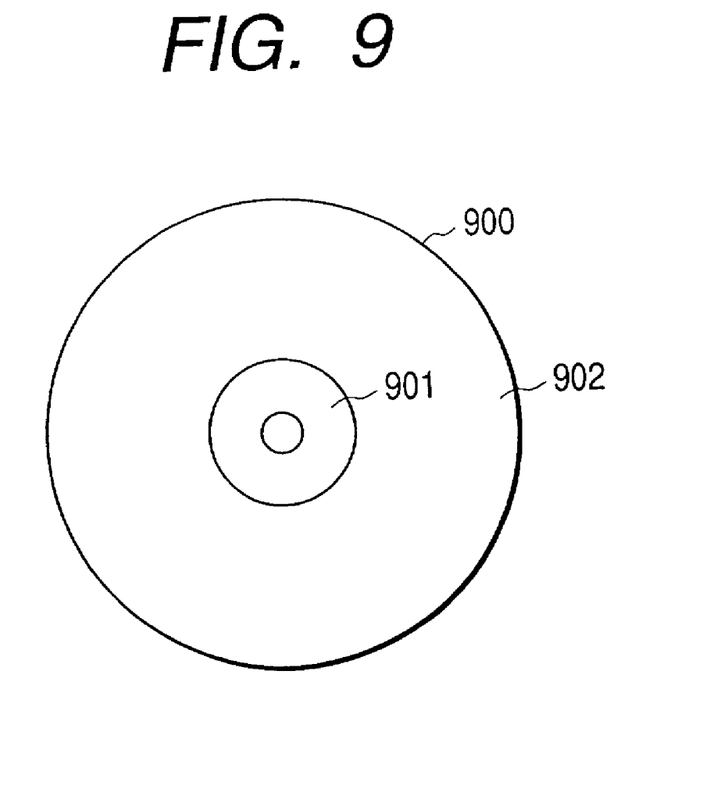
FIG. 9 is a diagram showing a recording area on the disk.

As mentioned above, the TOC is a storage area of management information regarding data recorded on the disk, and the portion on the disk where the TOC is recorded is called a TOC area in the following description. On the other hand, it is assumed that the portion where source data itself such as image/audio data or the like has been recorded is called a data area in the following description. As shown in FIG. 9, an area 901 corresponding to a predetermined number of tracks from the inner rim side on a disk 900 is a TOC area and an area 902 on the outside of the area 901 is a data area.

A definition of terms of "cut" and "sector" which are used in the following description will now be explained. "cut" denotes a unit of one image data train which corresponds to "a music piece" of a music CD for example. In the case where image data is recorded by a camera integrated type video recording apparatus, image data which is continuously recorded onto the disk for a period of time in a range from a "recording start" command by a recording trigger switch to a "recording stop" command corresponds to one cut, and if the data is managed by the TOC on the unit basis of the cut, it is convenient in case of performing an edition or the like.

Figure 3:
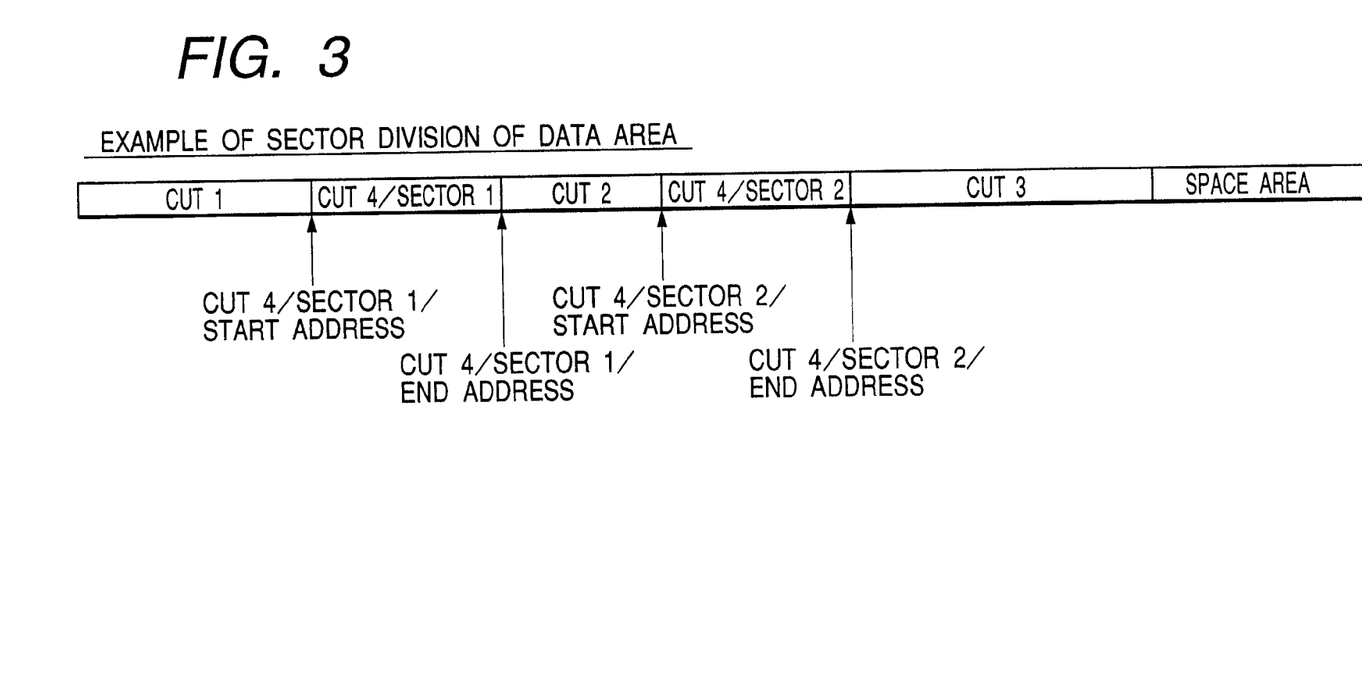
FIG. 3 is a diagram showing a state of recording data on a disk.

FIG. 3 is a diagram showing a state where several cuts have been enclosed in the data area of the disk.

As shown in the diagram, in the data area, a continuous area necessary to record one cut is not always assured. If the continuous data area is insufficient, it is also necessary to move a head or a pickup to another separate data area to record.

FIG. 3 shows an example in which the cut 4 is recorded after the cuts 1, 2, and 3 were recorded. However, since only sporadic areas are left as areas for the data of the cut 4, the cut 4 is divided into two sectors. Each recording area in the case where one cut is divided and recorded as mentioned above is called a sector in the following description.

Figure 4:
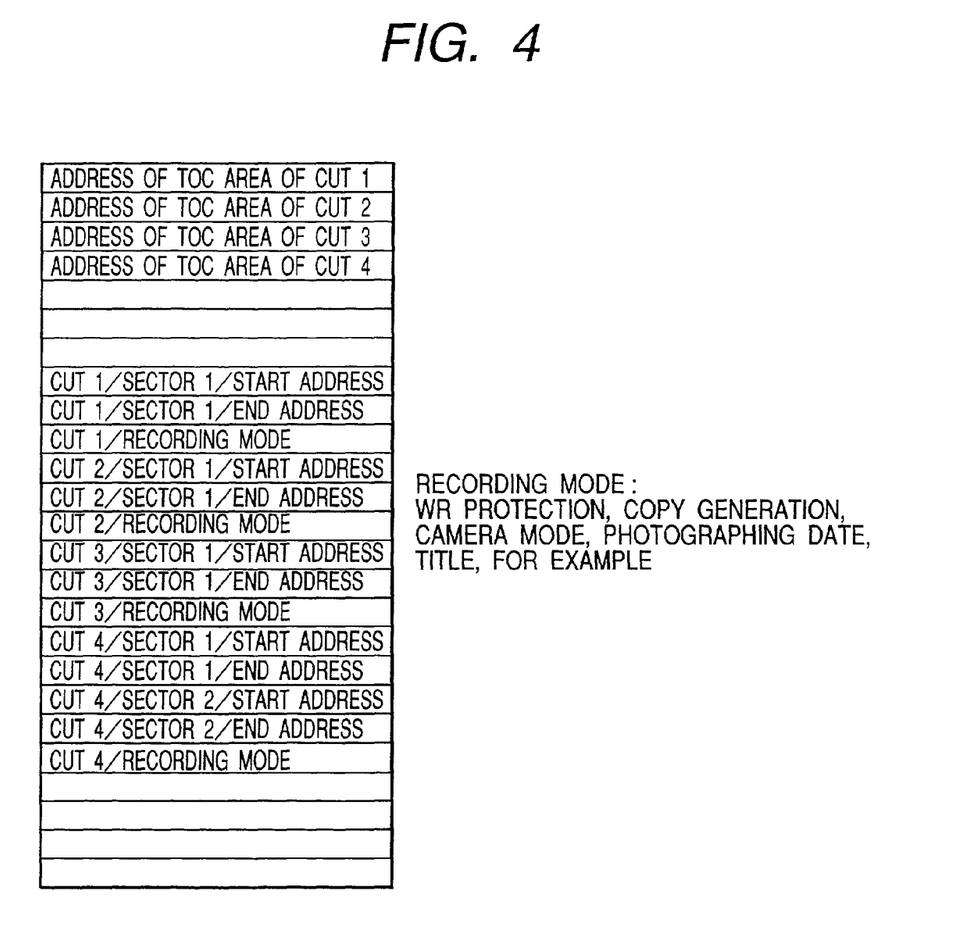
FIG. 4 is a diagram showing a state of TOC data.

In the embodiment, in the case where the data is recorded into the data area on the disk as shown in FIG. 3, the contents of the TOC data which is recorded in the TOC area have a format shown in FIG. 4.

That is, addresses in the TOC area in which the TOC data of each cut data has been recorded are arranged as pointers in the head addresses in the TOC area, and a START address, an END address, and a recording mode of each sector of each cut are sequentially described in the addresses shown by the pointers. As a recording mode, although any data can be recorded in accordance with characteristics of the apparatus itself, for example, a photographing date, a title, a camera mode, a write/read protection (WR protection), a copy generation, and the like can be mentioned.

Figure 1:
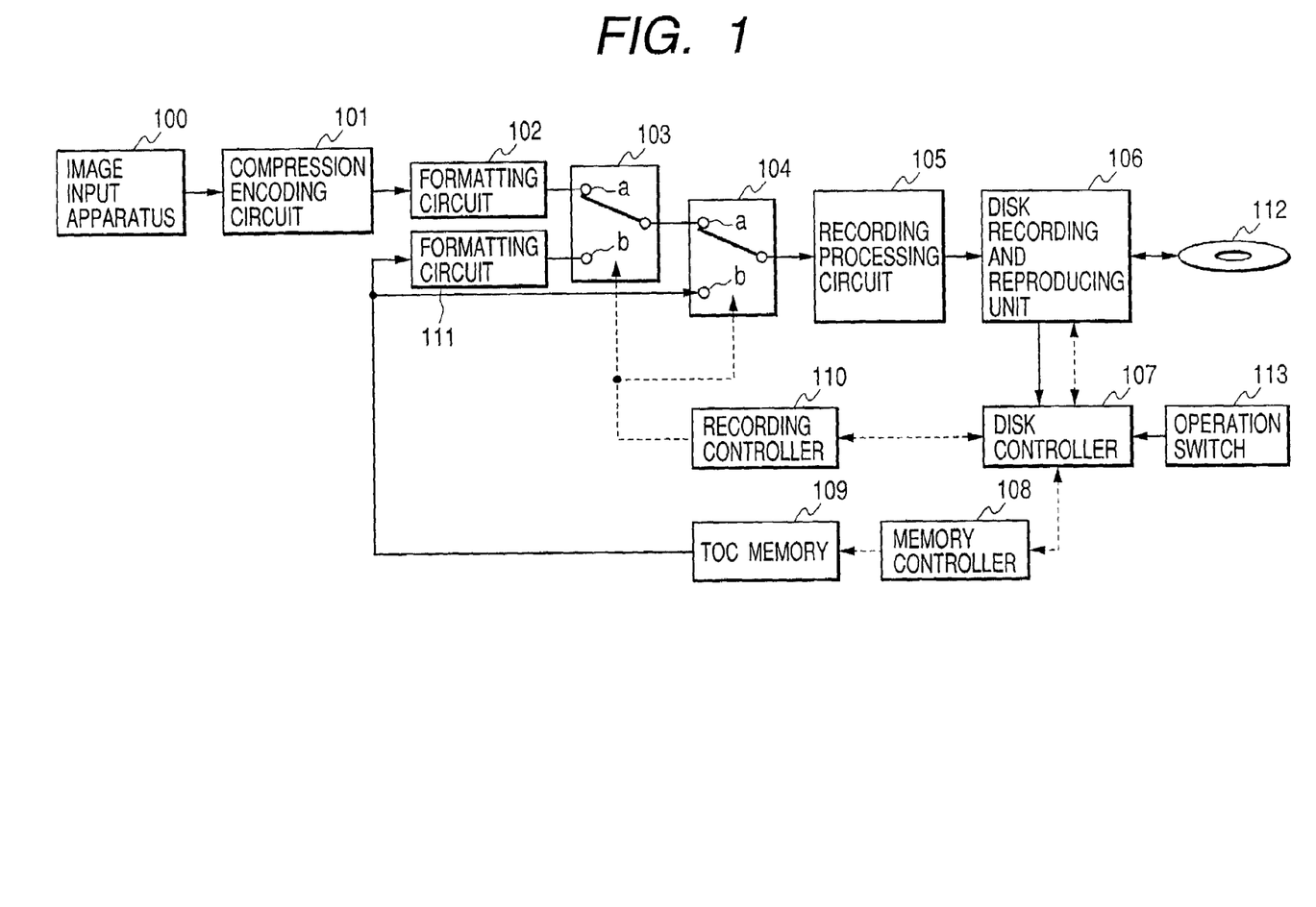
FIG. 1 is a diagram showing a construction of a recording and reproducing apparatus to which the invention is applied.

FIG. 1 is a block diagram showing a disk recording and reproducing apparatus according to the embodiment of the invention.

In FIG. 1, reference numeral 100 denotes an image input apparatus such as a camera or the like; 112 a disk; 101 a compression encoding circuit; 102 a formatting circuit for formatting image data to be recorded by adding a header thereto or the like; 103 a switch for selecting the image data or TOC data as data to be recorded in a data area of the disk 112; 104 a switch for selecting the image/TOC data to be recorded in the data area or TOC data to be recorded in a TOC area as data to be recorded onto the disk 112; 105 a recording processing circuit for performing processes which are necessary to record output data from the switch 104 onto the disk 112, on the output data; and 106 a disk recording and reproducing unit for recording data onto the disk 112 or reproducing the data from the disk 112. The disk recording and reproducing unit 106 includes a recording/reproducing head or a pickup.

Reference numeral 107 denotes a disk controller for controlling so as to retrieve a space area on the disk 112, move the recording/reproducing head or pickup to a designated address on the disk, or the like in accordance with the TOC data which is obtained from the disk recording and reproducing unit 106. Reference numeral 108 denotes a memory controller for rearranging address information which is outputted from the disk controller 107 and mapping the TOC data of the system; 109 a TOC memory comprising a semiconductor memory for storing the mapped TOC data; 110 a recording controller for switching the data to be recorded to the disk 112 by controlling the switches 103 and 104; and 111 a formatting circuit for formatting the TOC data which is inserted to an image data train by adding a header thereto or the like. Reference numeral 113 denotes an operation switch having various operation keys such as trigger key for instructing the start of the recording or the stop of the recording, power key, and the like.

Figure 6:
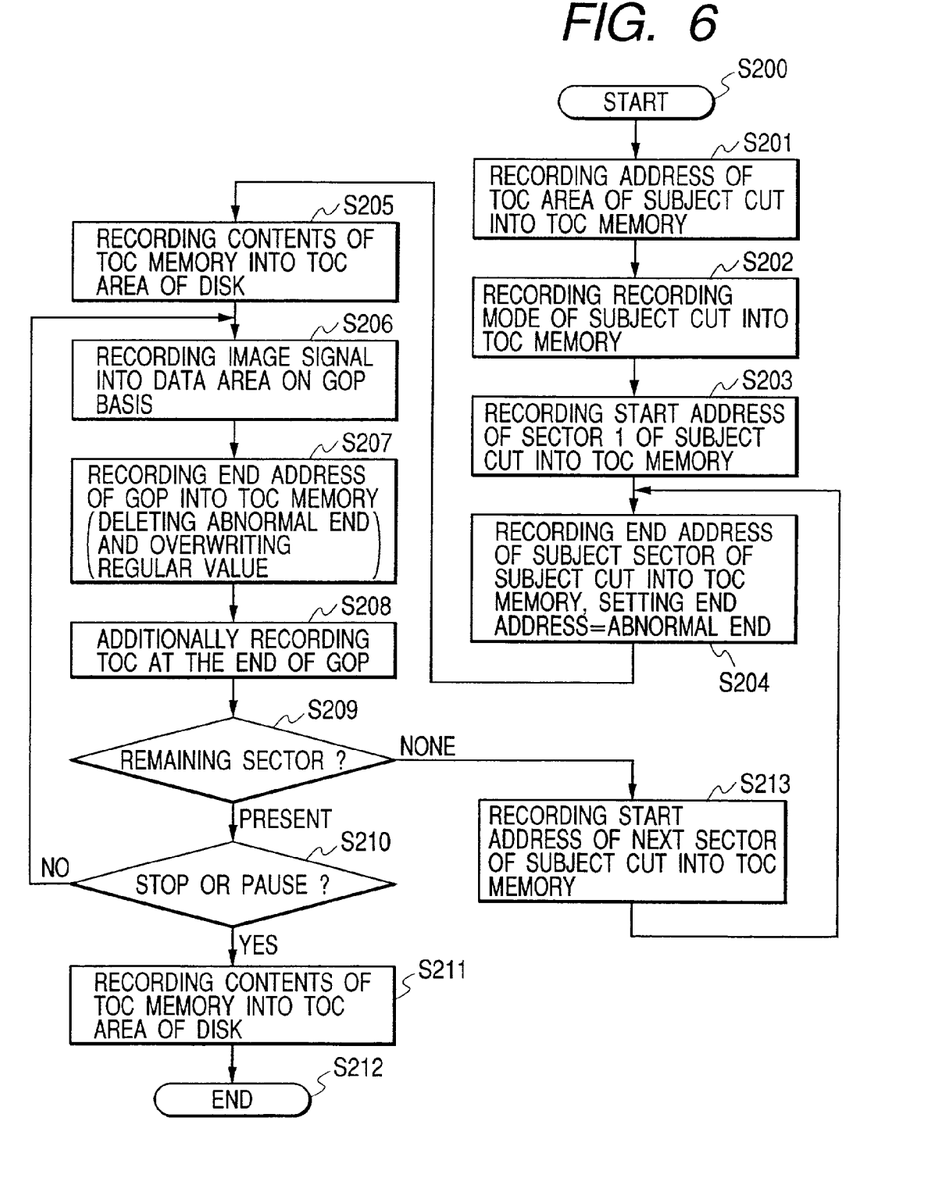
FIG. 6 is a flowchart for explaining the recording operation of the apparatus of FIG. 1.

The operation in the normal recording mode of the apparatus in FIG. 1 will now be described with reference to a flowchart of FIG. 6.

Figure 7:
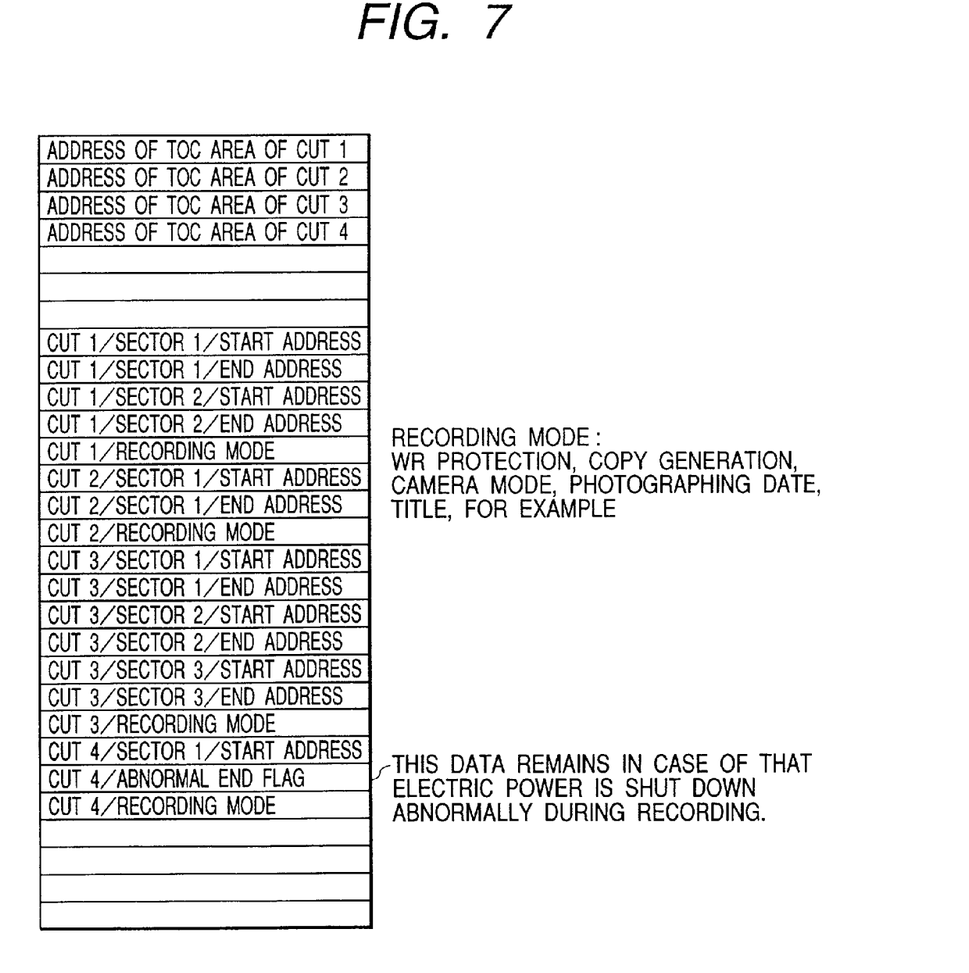
FIG. 7 is a diagram showing a state of the TOC data.

First, prior to recording the image data, the disk controller 107 retrieves a space area (recordable area: it denotes an area where no image data is recorded yet here) on the disk 112 on the basis of the TOC data which is reproduced from the disk 112. Subsequently, on the basis of the space area information, the memory controller 108 records the address on the disk of the TOC area where the TOC data of a cut to be recorded from now on is recorded, into the TOC memory 109 (step S201). The TOC data is recorded into the TOC memory 109 in a mapping format as shown in FIG. 4 or 7 together with the other information, which will be explained hereinlater.

Subsequently, the memory controller 108 records the recording mode of the system such as photographing date, title, camera mode, WR protection, copy generation, and the like into the TOC memory 109 (step S202). The memory controller 108 determines at which position on the data area of the disk 112 the cut to be recorded from now on is recorded, on the basis of the space area information of the disk 112 which the disk controller 107 has, and records a recording start point address (START address) into the TOC memory 109 (step S203). At this time point, since the cut whose recording is started corresponds to the first sector, it is recorded as an START address of the first sector of the present cut.

Subsequently, the memory controller 108 first writes a recording end point address (END address) of the present sector into the TOC memory 109 although the recording of the cut to be recorded from now on is not finished yet at this time point (step S204). In this instance, a predetermined value showing "abnormal end" is written as an END address. For example, in FIG. 7, an abnormal end flag has been written as an END address of the cut 4/sector 1.

The recording controller 110 controls so that the TOC data such as "address of the TOC area of the subject cut", "START address of the subject cut", "END address of the subject cut", "recording mode of the subject cut", and the like written in the TOC memory 109 by the above processes is transmitted to the disk side through a contact b of the switch 104. The TOC data is subjected to processes necessary for recording it onto the disk 112 by the recording processing circuit 105 and recorded into the TOC area designated by the disk controller 107 by the disk recording and reproducing unit 106 (step S205).

A preparation for recording the image data is finished as mentioned above. After that, when the start of the recording is instructed by the operation switch 113, the disk controller 107 controls the recording controller 110 and disk recording and reproducing unit 106 so that the image data train encoded on a GOP unit basis is sequentially recorded into the data area of the disk 112.

The operation for writing the image data train onto the disk (steps S206, S207, S208) will now be described.

The image data inputted from the image input apparatus 100 is converted into digital data and subjected to an MPEG encoding process by the compression encoding circuit 101 after that.

The data which was inputted in the order shown in FIG. 2 and subjected to the MPEG encoding process is formatted every 15 frames (=1 GOP). After that, a header showing the image data is further added to the head of the data of 1 GOP by the formatting circuit 102. In the embodiment, although the image data is inputted to the compression encoding circuit 101 in the order shown in FIG. 2, the encoding order is different from that shown in FIG. 2. That is, after a frame I0 was encoded, the compression encoding circuit 101 encodes last two B pictures (although not shown in FIG. 2, they are assumed to be B-2 and B-1) of the just-preceding GOP before encoding of frames B0 and B1 and, thereafter, encodes a P0 frame. After that, the compression encoding circuit 101 encodes frames in the order from B0, B1, P1, B2, B3, P2, B4, B5, P3, B6, and B7. Frames B8 and B9 are encoded after the head I picture, namely, I1 of the next GOP was encoded.

The TOC data which was mapped and stored in the TOC memory 109 is also read out and a header indicative of the TOC data is added thereto by the formatting circuit 111. The data from the formatting circuits 102 and 111 is switched by the switch 103 which is controlled by the recording controller 110 so that the image data and the TOC data are time-divisionally transmitted to a circuit at the post stage.

Figure 5A:
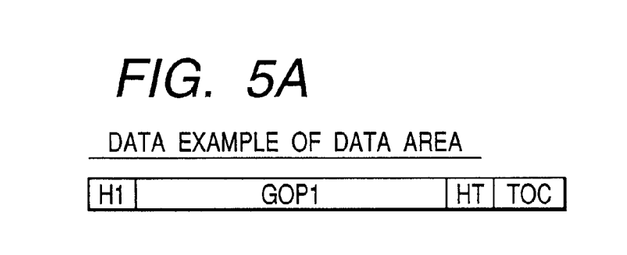
FIGS. 5A, 5B and 5C are diagrams showing a state of recording data recorded by the apparatus of FIG. 1.
Figure 5B:
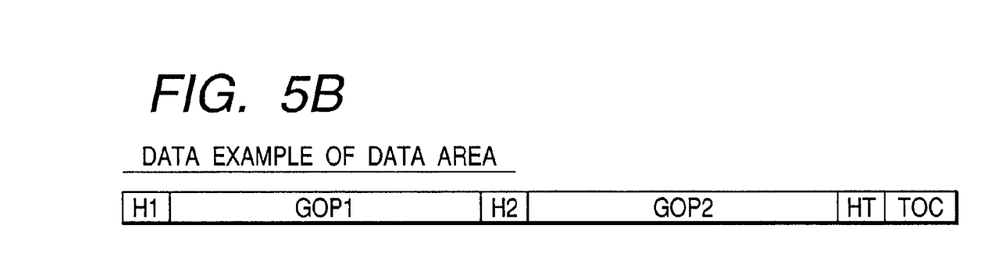
Figure 5C:
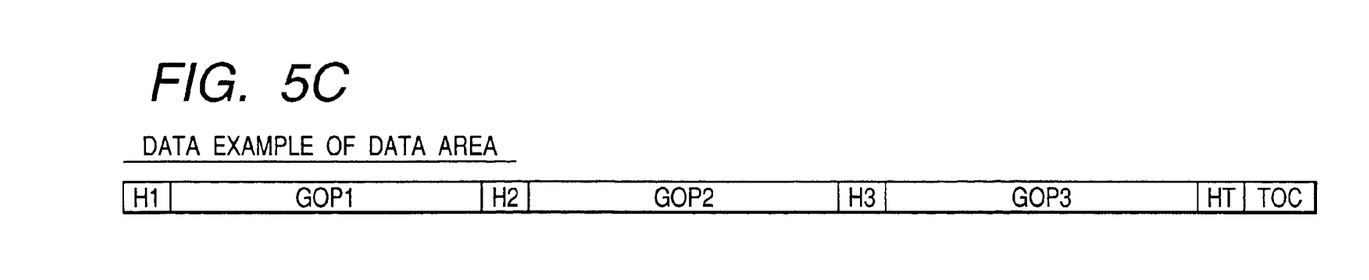

FIG. 5A shows an output data train of the switch 103. In FIGS. 5A to 5C, H1 denotes a header to GOP1, GOP1 indicates an encoded image data train of GOP1, HT shows a header for the TOC, and TOC indicates TOC data. That is, in the normal recording mode, the recording controller 110 controls the switches 103 and 104 so as to sequentially transmit the header of each GOP, the data of each GOP, the header of TOC, and the TOC data in this order.

A recording procedure in this instance will be described in detail. First, the image data encoded by the compression encoding circuit 101 is recorded onto the disk 112 on a GOP unit basis via the disk recording and reproducing unit 106 (step S206). Subsequently, the disk controller 107 retrieves the disk 112 via the disk recording and reproducing unit 106, finds an end recording address of the image data train of the currently recorded GOP, and writes this address into the TOC memory 109 via the memory controller 108. When it is written, a special value showing "abnormal end" written in place of the END address in step S204 is erased and the address is overwritten thereon (step S207).

The TOC data written in the TOC memory 109 is finally recorded onto the disk 112 (step S208) subsequently to the image data train of the GOP unit recorded in step S206.

In the data train shown in FIG. 5A, the data train just after one GOP was transmitted is shown. How to record the data after the second GOP and the third GOP were transmitted after that is shown in FIGS. 5B and 5C.

In FIGS. 5B and 5C, H2 denotes a header for GOP2 as the second GOP. That is, the header of GOP2 and the data of GOP2 are recorded from the recording address of the TOC data so as to be overwritten onto the TOC data recorded subsequently to the data of GOP1. After that, the header of the TOC data and the TOC data are recorded.

Also in the case where the third GOP has been transmitted, they are recorded in a similar method. That is, the header of GOP3 and the data of GOP3 are recorded so as to be overwritten onto the TOC data recorded subsequently to the data of GOP2. After that, the header of the TOC data and the TOC data are recorded.

As TOC data which is recorded at the end of the image data train described here, it is desirable that the TOC data is recorded in a mapping format as shown in FIG. 4 or 7. However, considering a processing speed or the like of the apparatus, only the information of the cut and sector which are being recorded at present, among the data recorded in the TOC memory 109 can be extracted and recorded.

In the disk recording and reproducing apparatus, the image data cannot be perfectly spirally recorded on the disk as shown in FIGS. 5A, 5B and 5C and it is necessary to move back the relative position of the recording head or pickup and re-record (new GOP data is written by overwriting onto the recording address of the previous TOC data), to write the TOC data into the data area. This operation is performed by the disk controller 107.

During the recording of the ordinary image data, the output data of the switch 103 is controlled by the recording controller 110 and transmitted so as to be inputted to a contact (a) of the switch 104 and is recorded into the data area of the disk 112. The image data is subjected to processes such as binarization, D/A conversion, and the like by the recording processing circuit 105 and, thereafter, it is recorded into the area designated by the disk controller 107 by the disk recording and reproducing unit 106.

The image data recording process in steps S206, S207, and S208 is continued while the disk controller 107 always monitors the presence or absence of the continuous area (=remaining sector) of the sector in the data area where the data is at present being recorded (step S209).

When the continuous area of the sector of the data area remains, it is discriminated whether an end of the recording of the present cut has been instructed to the disk recording and reproducing apparatus by the user by the trigger key of the operation switch 113 or not (step S210). When the stop of the recording is not requested, the processing routine is again returned to step S206 and the image data recording process is continued.

When there is the request to stop the recording, the recording controller 110 controls so that the contents in the TOC memory 109 are transmitted to the disk side via the switch 104. After the TOC data was subjected to processes such as binarization, D/A conversion, and the like by the recording processing circuit 105, it is recorded into the TOC area on the disk 112 designated by the disk controller 107 via the disk recording and reproducing unit 106 (step S211). A series of image data recording process is finished (step S212).

When it is determined by the disk controller 107 in step S209 during the image data recording process that there is no remaining sector where the data is being recorded at present, the processing routine advances to step S213. A new sector is generated on the TOC memory 109, the disk controller 107 sets the START address of this sector, and it is written into the TOC memory 109 via the memory controller 108 (step S213).

After that, the processing routine is returned to the main flow and the process in step S204 is executed. At this time, a predetermined value showing "abnormal end" is written as a recording end address of the subject sector as mentioned above. Subsequently, the recording controller 110 controls in a manner such that all of the "address of the TOC area of the subject cut", "START address of the subject cut", "END address of the subject cut", and "recording mode of the subject cut" written in the TOC memory 109 by the above processes or only the information of "START address" and "END address" of the updated sector and "END address" of the sector before updating is transmitted to the disk side via the switch 104.

After the TOC data was subjected to the processes such as binarization and D/A conversion by the recording processing circuit 105, it is recorded into the TOC area of the disk 112 designated by the disk controller 107 by the disk recording and reproducing unit 106 (step S205). As mentioned above, in the embodiment, each time the recording of the data is started to a new sector, the TOC data of the subject sector is recorded in the TOC area. At this time, the predetermined value showing the abnormal end is also written as an END address.

To which extent the information in the TOC area is rewritten (whether all of the TOC information is rewritten or the information is rewritten with respect to only the sector which is being recorded at present as a target) in step S205 can be changed in accordance with a surplus degree of the control of the disk recording and reproducing apparatus as a system.

A case where an accident such that a voltage of a battery drops, the battery is disconnected, or the like has occurred during the image data recording process will now be explained.

As described above, the TOC data in the embodiment has already been written in the TOC area of the disk 112 by the operation in step S205 with regard to "START address" and "recording mode" of the cut which is being recorded.

Since the TOC data is previously recorded onto the disk prior to starting the recording of the image data train, it is not the information which is erased when an accident occurs during the recording of the image data onto the disk and the recording operation was stopped. In addition to this, in the embodiment, the other TOC data including "END address" at a point when the image data train of the GOP unit has been recorded is recorded at the end of the image data train of the GOP unit during the recording of the image data. Therefore, even if an accident occurs and the recording operation was stopped, the TOC data regarding the GOP recorded just before is perfectly recorded and stored.

Figure 8:
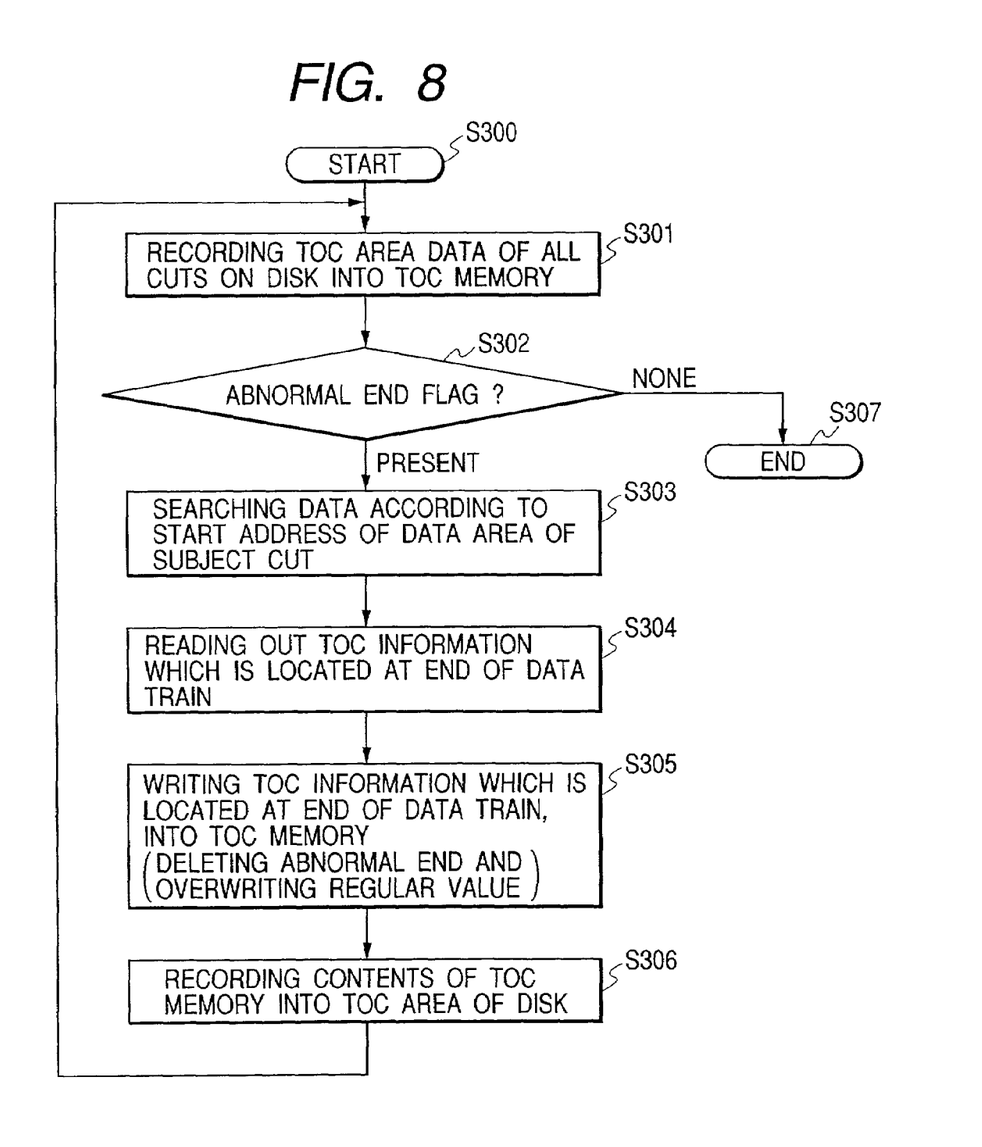
FIG. 8 is a flowchart for explaining a checking process of the TOC data by the apparatus of FIG. 1.

The operation of the embodiment which is performed when the power source is turned on or the disk is inserted will now be described with reference to a flowchart of FIG. 8. FIG. 8 shows a process which is executed by the disk recording and reproducing apparatus when the power source of the system is turned on in a state where the disk has been inserted or when the disk is inserted.

First, the disk recording and reproducing unit 106 is controlled so that the disk controller 107 retrieves the TOC area and reads out the TOC data from the disk 112 and the TOC data is recorded into the TOC memory 109 via the memory controller 108 (step S301). Whether an abnormal end flag remains in the TOC data recorded in the TOC memory 109 or not is subsequently discriminated (step S302). The abnormal end flag was written in the beginning of the image data recording process (step S204 in FIG. 6). When the image data recording process is interrupted by an accident, this flag remains in a form as shown in FIG. 7.

When the abnormal end flag does not remain, since this means that the recording operation of the image data onto the disk 112 inserted at present has normally been finished, an inspecting process at the time of insertion of the disk can be finished (step S307).

However, if the abnormal end flag is found in the TOC memory in step S302, the disk controller 107 controls the disk recording and reproducing unit 106, thereby allowing the head or pickup to be sought to the data area where the image data of the cut/sector corresponding to the remaining abnormal end flag has been recorded.

Since the START address of the subject cut/sector has been recorded in the TOC area as shown in FIG. 7, the disk controller 107 retrieves the recorded image data train from the START address of the cut/sector having the abnormal end flag (step S303).

When the image data train of the subject cut/sector is found, the head or pickup is sought to the TOC data with the header written at the end of the data train to read out the TOC data (step S304).

After the image data train recorded after the START address of the cut/sector having the abnormal end flag was found, in the process for reading out the TOC data, there is no need to read out all of the image information. The retrieving time can be reduced by retrieving only each GOP and the header of the TOC data as necessary.

The disk controller 107 reads out the END address of the subject cut/sector by the TOC data read out in step S304, the special value indicative of "abnormal end" remaining in the TOC memory is erased and this END address is overwritten thereon by the disk controller 107 via the memory controller 108 (step S305).

Finally, the TOC data on the TOC memory whose END address was corrected is rewritten into the TOC area of the disk 112 from the TOC memory 109 via the switch 104 and recording processing circuit 105.

By controlling the apparatus as shown in FIG. 8, even if an unexpected accident such as a shortage of the power voltage occurs during the recording onto the disk by using the apparatus, the data in the TOC area of the disk used at this time can be recovered when the power source is subsequently turned on or when the disk is inserted.

According to the embodiment, since the TOC data is recorded together with the image data into the data area on the disk, even if a trouble such that the power voltage is shut off during the image recording or the like occurs, the TOC data of the image data which is being recorded remains certainly on the disk. Thus, by writing back the TOC data of the data area into the TOC area, the data of the TOC area at the time of occurrence of the trouble can be perfectly recovered.

Further, whether there was a trouble with the disk during the recording of the image data or not can be checked by the abnormal end flag of the TOC area. The defective disk in which the abnormal end flag is set to "1" can be recovered by writing back the TOC data of the data area into the TOC area.

Only the data regarding the recording end address which is a part of the TOC data or only the TOC data of only the sector at the time of occurrence of the trouble is recorded in the data area or only the TOC data is left for each recording image data train, so that the data capacity which is required for recovery can be miniaturized and the process that is required for recovery can be simplified.

In the embodiment, in order to detect whether the recording of the image data has normally been finished or not, the special value indicative of the abnormal end is recorded as an END address of the TOC data. However, data showing the abnormal end other than the END address can be also separately recorded in the TOC data.

A storage medium as another embodiment will now be described.

Although the system shown in FIG. 1 according to the foregoing embodiment can be constructed by hardware, it can be also constructed by a computer system having a CPU and a memory. In case of constructing it by the computer system, the memory constructs the storage medium according to the invention. A program for executing the operation and processes described in the embodiment and each flowchart is stored on the storage medium.

A semiconductor memory such as ROM, RAM, or the like, an optical disk, a magnetooptic disk, a magnetic recording medium, or the like can be used as a storage medium. Each of them can be also constructed in a CD-ROM, an FD, a magnetic card, a magnetic tape, a nonvolatile memory card, or the like and used.

Therefore, functions similar to those in the foregoing embodiment can be realized by a method whereby the storage medium is used in a system or apparatus other than the system of FIG. 1, such a system or a computer reads out program codes stored in the storage medium and executes operations corresponding thereto. Technological effects similar to those of the foregoing embodiment can be obtained and the objects of the invention can be accomplished by this method.

Functions similar to those in the foregoing embodiment can be also realized in a case where the OS or the like which is operating on the computer executes a part or all of the processes or the program codes read out from the storage medium are written into a memory equipped with a function expanding board inserted in the computer or a function expanding unit connected to the computer and, thereafter, a CPU or the like provided for the function expanding board or function expanding unit executes a part or all of the processes on the basis of instructions of the program codes. Technological effects similar to those of the foregoing embodiment can be obtained and the objects of the invention can be accomplished.

As described above, according to the embodiment, since the management data such as TOC data or the like is recorded in the data area on the disk recording medium together with the image data, even if there is a trouble during the image recording, the management data of the image data which is being recorded remains certainly on the recording medium. Therefore, by writing back the management data in the data area into the management data area, the management data at the time of occurrence of the trouble can be perfectly recovered.

The presence or absence of a trouble during the recording can be confirmed by checking whether the predetermined value such as an abnormal end flag or the like has been recorded in the management data area or not. If the predetermined value is recorded, the management data of the data area can be recovered by writing it back into the management data area.

When the management data is written back, only the recording end address which is a part of the management data or only the management data regarding the image data train at the time of occurrence of a trouble is written back and, further, only one management data is left for each recording image data train. Thus, the data capacity which is required for recovery can be minimized and the process which is required for recovery can be simplified.

Many widely different embodiments of the present invention may be constructed without departing from the spirit and scope of the present invention. It should be understood that the present invention is not limited to the specific embodiments described in the specification, except as defined in the appended claims.

What is claimed is:

1. A recording apparatus comprising:
   recording means for recording on a recording medium image data and management data, said management data including a start address area for recording a start address of the image data and an end address area for recording an end address of the image data; and
   control means for controlling said recording means so as to record on the recording medium a predetermined value, irrespective of recording addresses where the image data are recorded and other than the recording end address, in the end address area of the management data in accordance with a recording instruction.

2. An apparatus according to claim 1, wherein said recording means records said image data into a first area on said recording medium and records said management data into a second area on said recording medium.

3. An apparatus according to claim 1, wherein said control means controls said recording means so as to record on the recording medium a value corresponding to a recording stop address of the image data in the end address area of the management data in accordance with a recording stop instruction.

4. An apparatus according to claim 1, wherein said control means controls said recording means so as to record an image data train comprising a plurality of image data groups each of which has the image data for a predetermined period and to record second management data indicating a recording end address of each of the image data groups.

5. An apparatus according to claim 4, wherein the second management data are added to the end of each of the image data groups and wherein said control means controls said recording means so as to overwrite a new image data group onto an address where the second management data of the image data group recorded just before has been recorded.

6. An apparatus according to claim 4, further comprising reproducing means for reproducing the management data and the second management data from said recording medium, wherein in case that the predetermined value is recorded in the end address area of the management data reduced by said reproducing means, and said control means controls said recording means so as to record the recording end address of the second management data in the end address area of the management data instead of the predetermined value.

7. A record apparatus comprising:
   recording means for recording image data on a disk-shaped recording medium;
   instructing means for instructing a recording of the image data and a recording stop of the image data, wherein said recording means starts to record the image data in response to the recording instruction and stops recording the image data in response to the recording stop instruction; and
   control means for controlling said recording means so as to record on the disk-shaped recording medium management data including a recording start address information of the image data and flag data indicating that the recording stop of the image data by the recording stop instruction is not performed, in accordance with the recording instruction.

8. An apparatus according to claim 7, wherein said control means controls said recording means so as to erase said flag data from the disk-shaped recording medium and to record on the disk-shaped recording medium recording end address information of the image data in response to the recording stop instruction.

9. An apparatus according to claim 7, wherein said control means controls said recording means so as to record an image data train comprising a plurality of image data groups each of which has the image data for a predetermined period and to record second management data indicating a recording end address of each of the image data groups.

10. An apparatus according to claim 9, wherein the second management data are added to the end of the image data group and wherein said control means controls said recording means so as to overwrite a new image data group and address where the second management data of the image data group recorded just before has been recorded.

11. An apparatus according to claim 9, further comprising reproducing means for reproducing the data from said recording medium,
   and wherein said control means controls said recording means so as to record the recording end address of the second management data in the end address area of the management data instead of the flag data.

12. An apparatus according to claim 7, wherein said recording means includes encoding means for encoding the image data and records said encoded image data.

13. An apparatus according to claim 7, wherein said recording means includes a memory for storing said management data, forms said management data by using said memory, and records the management data stored in said memory onto said disk-shaped recording medium in response to said recording stop instruction.

14. A recording apparatus for recording image data and table data for reproduction management of the image data onto a disk-shaped recording medium,
wherein said apparatus records onto the disk-shaped recording medium the table data including flag information indicating that the recording of the image data is not normally finished in accordance with a recording instruction and deletes the flag information from the table data recorded on the disk-shaped recording medium when the recording of the image data is normally finished.

15. A recording apparatus comprising:
recording means for recording an image data train comprising a plurality of image data groups each of which has image data of n frames (n is an integer of 2 or more) on a disk-shaped recording medium;
control means for controlling said recording means so as to record first management data including a recording end address information indicating a recording end address of the image data train in an image data area on the disk-shaped recording medium every time one data group is recorded and to record second management data including recording start address information indicating a recording address of the image data train and flag information indicating the recording of the image data is not normally finished in a management data area on the disk-shaped recording medium in accordance with a recording instruction of the image data train;
detecting means for detecting the flag information in the second management data recorded on the disk-shaped recording medium; and
rewriting means for detecting the recording end address information included in the first management data recorded on the disk-shaped recording medium and recording the recording end address information in the second management data recorded on the disk-sha0ped recording medium in response to a detection of the flag information by said detecting means.

16. An apparatus according to claim 15, wherein said recording means includes encoding means for encoding said image data on a unit basis of n frames and records said encoded image data.

17. An apparatus according to claim 15, wherein in case of recording a new image data group, said control means controls said recording means so as to overwrite said new image data group onto an address where the first management data of the image data group recorded just before has been recorded.

18. A recording method comprising the steps of:
recording on a recording medium image data and management data said management data including a start address area for recording a start address of the image data and an end address area or recording an end address of the image data; and
controlling a recording operation in said recording step in such a manner that a predetermined value, irrespective of recording addresses where the image data are recorded and except the recording end address, is recorded on the recording medium in the end address area of the management data in accordance with a recording instruction.

19. A recording method comprising the steps of:
recording image data on a disk-shaped recording medium;
instructing a recording of the image data and a recording stop of the image data, wherein said recording step is arranged to start to record the image data in response to the recording instruction and stop recording the image data in response to the recording stop instruction; and
controlling a recording operation in said recording step so as to record on the disk-shaped recording management data including a recording start address information of the image data and flag data indicating that the recording stop of the image data by the recording stop instruction is not performed in accordance with the recording instruction.

20. A recording method comprising the steps of:
recording an image data train comprising a plurality of image data groups each of which has image data of n frames (n is an integer of 2 or more) on a disk-shaped recording medium;
controlling a recording operation in said recording step so as to record first management data including recording end address information indicating a recoding address of the image data train in an image data area on the disk-shaped recording medium every time one image data group is recorded, and to record second management data including recording start address information indicating a recording address of the image data train and flag information indicating the recording of the image data is not normally finished in a management data area on the disk-shaped recording medium in accordance with a recording instruction of the image data train;
detecting the flag information in the second management data recorded on the disk-shaped recording medium; and
detecting the recording end address information included in the first management data recorded on the disk-shaped recording medium and recording the recording end address information into the second management data recorded on the disk-shaped recording medium in response to a detection of the flag information by said detecting means.

21. A computer-readable recording medium which stores a program for recording image data on a recording medium, wherein said program comprises the steps of:
recording image data and management data, said management data including a start address area for recording start address of the image data and an end address area for the recording end address of the image data on said recording medium; and
controlling a recording operation in said recording step in such a manner that a predetermined value, irrespective of recording addresses where the image data are recorded and except the recording end address, is recorded on the recording medium in the end address area of the management data in accordance with a recording instruction.

22. A computer-readable recording medium which stores a program comprising the steps of:
recording image data on a disk-shaped recording medium;
instructing a recording of the image data and a recording stop of the image data, wherein said recording step is arranged to start to record the image data in response to the recording instruction and stop recording the image data in response to the recording stop instruction; and
controlling a recording operation in said recording step so as to record on the disk-shaped recording medium management data including a recording start address information of the image data and flag data indicating that the recording stop of the image data by the recording stop instruction is not performed in accordance with the recording instruction.

23. A computer-readable medium which stores a program comprising the steps of:
recording an image data train comprising a plurality of image data groups each of which has image data of n frames (n is an integer of 2 or more) on a disk-shaped recording medium;
controlling a recording operation in said recording step so as to record first management data including recording end address information indicating a recording address of the image data train in an image data area on the disk-shaped recording medium every time one image data group is recorded, and to record second management data including recording start address information indicating a recording address of the image data train and flag information indicating the recording of the image data is not normally finished in a management data area on the disk-shaped recording medium in accordance with a recording instruction of the image data train;
detecting the flag information in the second management data recorded on the disk-shaped recording medium; and
detecting the recording end address information included in the first management data recorded on the disk-shaped recording medium and recording the recording end address information into the second management data recorded on the disk-shaped recording medium in response to a detection of the flag information by said detecting means.

* * * * *

UNITED STATES PATENT AND TRADEMARK OFFICE
CERTIFICATE OF CORRECTION

| | | |
|---|---|---|
| PATENT NO. | : 7,099,562 B1 | Page 1 of 1 |
| APPLICATION NO. | : 09/620475 | |
| DATED | : August 29, 2006 | |
| INVENTOR(S) | : Toshinori Yamamoto | |

It is certified that error appears in the above-identified patent and that said Letters Patent is hereby corrected as shown below:

COLUMN 11:

Line 42, "disk-shaOped" should read --disk-shaped--; and
    Line 57, "data" (first occurrence) should read --data,--.

COLUMN 12:

Line 22, "recoding" should read --recording--.

Signed and Sealed this

Twenty-third Day of October, 2007

JON W. DUDAS
*Director of the United States Patent and Trademark Office*